(12) United States Patent
Kim et al.

(10) Patent No.: US 8,530,093 B2
(45) Date of Patent: Sep. 10, 2013

(54) ELECTRODE ACTIVE MATERIAL, METHOD OF PREPARING THE SAME, ELECTRODE FOR LITHIUM SECONDARY BATTERY WHICH INCLUDES THE SAME, AND LITHIUM SECONDARY BATTERY USING THE ELECTRODE

(75) Inventors: Jae-Hyuk Kim, Yongin-si (KR);
Sung-Hwan Moon, Yongin-si (KR);
Hee-Young Chu, Yongin-si (KR);
Myung-Hwan Jeong, Yongin-si (KR);
Chang-Ui Jeong, Yongin-si (KR); Yury Matulevich, Yongin-si (KR); Jong-Seo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 3 days.

(21) Appl. No.: 13/241,196

(22) Filed: Sep. 22, 2011

(65) Prior Publication Data
US 2012/0301788 A1    Nov. 29, 2012

(30) Foreign Application Priority Data
May 27, 2011   (KR) .................. 10-2011-0050841

(51) Int. Cl.
*H01M 2/00*   (2006.01)

(52) U.S. Cl.
USPC ..................... 429/231.6; 252/182.1

(58) Field of Classification Search
USPC .......... 429/231.95, 231.9, 351, 231.6, 218.1, 429/221, 223, 224, 225, 220
See application file for complete search history.

(56) References Cited

U.S. PATENT DOCUMENTS

| | | | |
|---|---|---|---|
| 4,321,163 A | 3/1982 | Wahl et al. | |
| 4,948,682 A | 8/1990 | Sonneveld | |
| 5,314,765 A | 5/1994 | Bates | |
| 6,770,400 B2 | 8/2004 | Tsutsumi et al. | |
| 2002/0182507 A1* | 12/2002 | Tsutsumi et al. | ........ 429/231.95 |
| 2004/0209159 A1 | 10/2004 | Lee et al. | |
| 2004/0253518 A1 | 12/2004 | Hosoya et al. | |
| 2006/0292446 A1 | 12/2006 | Kweon et al. | |

FOREIGN PATENT DOCUMENTS

| | | |
|---|---|---|
| JP | 7-130366 A | 5/1995 |
| JP | 2003-132886 A | 5/2003 |
| KR | 1989-0013823 A | 9/1989 |
| KR | 2000-0074691 | 12/2000 |
| KR | 2004-0089514 A | 10/2004 |
| KR | 2004-0090561 A | 10/2004 |
| KR | 10-2007-0066453 | 6/2007 |

OTHER PUBLICATIONS

English Machine Translation of JP 1995-130366 A, 61 pages.
KIPO Notice of Allowance dated Jun. 28, 2013, for Korean priority Patent application 10-2011-0050841, (6 pages).

* cited by examiner

*Primary Examiner* — Mark F Huff
*Assistant Examiner* — Monique Wills
(74) *Attorney, Agent, or Firm* — Christie, Parker & Hale, LLP (57) ABSTRACT

An electrode active material including a core active material and a coating layer, including a compound represented as the following Formula 1, on a surface of the core active material, a method of preparing the same, an electrode for a lithium secondary battery which includes the same, and a lithium secondary battery using the electrode.

$$Li_a\text{-}M_b\text{-}N_c \qquad \text{[Formula 1]}$$

where, M denotes an alkaline earth metal, a/(a+b+c) is in a range of about 0.10 to about 0.40, b/(a+b+c) is in a range of about 0.20 to about 0.50, and c/(a+b+c) is in a range of about 0.20 to about 0.50.

16 Claims, 7 Drawing Sheets

ELECTRODE ACTIVE MATERIAL, METHOD OF PREPARING THE SAME, ELECTRODE FOR LITHIUM SECONDARY BATTERY WHICH INCLUDES THE SAME, AND LITHIUM SECONDARY BATTERY USING THE ELECTRODE

RELATED APPLICATION

This application claims priority to and the benefit of Korean Patent Application No. 10-2011-0050841, filed on May 27, 2011, in the Korean Intellectual Property Office, the entire content of which is incorporated herein by reference.

BACKGROUND

1. Field

One or more embodiments of the present invention relate to an electrode active material, a method of preparing the same, an electrode for a lithium secondary battery which includes the same, and a lithium secondary battery using the electrode.

2. Description of the Related Art

Lithium secondary batteries have been in the spotlight as power sources for the latest small portable electronic devices because they have high energy densities and because the lithium secondary batteries, which use organic electrolytes, have discharge voltages that are twice or more higher than those of typical batteries using alkaline aqueous solutions.

A lithium secondary battery uses materials capable of inserting (intercalating) and extracting (de-intercalating) lithium ions as an anode and a cathode, and is prepared by disposing an electrolyte between the cathode and the anode. The lithium secondary battery generates electrical energy by oxidation reaction and reduction reaction when lithium ions are inserted and extracted at the cathode and the anode, respectively.

The life of a lithium secondary battery is decreased because an irreversible product is formed by a reaction between an electrolytic solution and an active material of the matter and the electrolytic solution decomposes during charging and discharging of the battery. In order to protect from or prevent such a decrease in battery life, a method of coating $Al_2O_3$, $AlPO_4$, lithium titanium aluminum phosphate, or the like on a surface of a cathode active material or an anode active material has been suggested.

However, there is much room for improvement because lithium batteries have not reached a satisfactory level with respect to their life characteristics.

SUMMARY

Aspects of embodiments of the present invention are directed toward an electrode active material having improved stability and good charge-discharge characteristics, a method of preparing the same, an electrode for a lithium secondary battery which includes the same, and a lithium secondary battery using the electrode.

Additional aspects will be set forth in part in the description which follows and, in part, will be apparent from the description, or may be learned by practice of the presented embodiments.

According to one or more embodiments of the present invention, an electrode active material includes: a core active material; and a coating layer, including a compound represented as Formula 1 below, on a surface of the core active material.

$$Li_a\text{-}M_b\text{-}N_c \quad \text{[Formula 1]}$$

where, M denotes an alkaline earth metal,
a/(a+b+c) is in a range of about 0.10 to about 0.40,
b/(a+b+c) is in a range of about 0.20 to about 0.50, and
c/(a+b+c) is in a range of about 0.20 to about 0.50.

According to one or more embodiments of the present invention, a method of preparing an electrode active material includes: performing a first heat treatment of a core active material doped with an alkaline earth metal (M) in a vacuum at a temperature in a range of about 750° C. to about 850° C.; and performing a second heat treatment of the heat-treated core active material in a nitrogen atmosphere.

According to one or more embodiments of the present invention, an electrode for a lithium secondary battery includes the foregoing electrode active materials.

According to one or more embodiments of the present invention, a lithium secondary battery includes the foregoing electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the present description.

Provided is an electrode active material including a core active material and a coating layer including a compound represented as the following Formula 1 formed on the core active material.

$$Li_a\text{-}M_b\text{-}N_c \quad \text{[Formula 1]}$$

where, M denotes an alkaline earth metal,
a/(a+b+c) is in a range of about 0.10 to about 0.40,
b/(a+b+c) is in a range of about 0.20 to about 0.50, and
c/(a+b+c) is in a range of about 0.20 to about 0.50.

In the Formula 1, M is at least one selected from the group consisting of magnesium (Mg), calcium (Ca), strontium (Sr), and barium (Ba).

When the contents of an alkaline earth metal and nitrogen are in the foregoing ranges, thermal and lithium-ion conduction properties of the compound of Formula 1 are excellent.

In Formula 1, a/(a+b+c) is in a range of about 0.15 to about 0.35, and for example, about 0.2 to about 0.33, b/(a+b+c) is in a range of about 0.30 to about 0.45, and for example, about 0.31 to about 0.33, and c/(a+b+c) is in a range of about 0.30 to about 0.45, and for example, about 0.31 to about 0.33.

According to an embodiment, in an electrode active material of Formula 1, a is in a range of about 0.5 to about 1.0, b is about 1.0, and c is about 1.0.

When a coating layer composed of the compound of Formula 1 is formed on a surface of a core active material, the electrode active material has stable characteristics and maintains low resistance characteristics in an environment of continuous insertion and extraction of lithium ions.

In an electrode active material according to an embodiment of the present invention, a thickness of a coating layer is in a range of about 1 nm to about 100 nm. When the thickness of the coating layer is in the foregoing range, ion conduction properties of the electrode active material are excellent.

An average particle diameter of the electrode active material is in a range of about 1 μm to about 30 μm, and according to an embodiment, about 8 μm to about 12 μm. When the average particle diameter of a cathode active material is in the foregoing range, capacity characteristics of a battery are excellent.

Hereinafter, a method of preparing an electrode active material, according to an embodiment of the present invention, is described.

First, a first heat treatment is performed on a core active material doped with an alkaline earth metal at a temperature range of about 750° C. to about 850° C. under a vacuum condition.

The time of the first heat treatment varies depending on the heat treatment temperature, and for example, the first heat treatment may be performed for about 20 minutes to about 60 minutes.

The temperature of the first heat treatment, for example, is about 800° C.

When the first heat treatment temperature is in the foregoing temperature range, a coating layer including a compound represented as Formula 1 is formed on a surface of a core active material by allowing an alkaline earth metal doped in the core active material to be transferred to the surface. Therefore, thermal and lithium-ion conduction properties of the finally obtained electrode active material are excellent.

[Formula 1]

where, M denotes an alkaline earth metal,
a/(a+b+c) is in a range of about 0.10 to about 0.40,
b/(a+b+c) is in a range of about 0.20 to about 0.50, and
c/(a+b+c) is in a range of about 0.20 to about 0.50.

Subsequently, a second heat treatment is performed on the first heat-treated core active material in a nitrogen atmosphere.

The second heat treatment is performed at a temperature range of about 750° C. to about 850° C., and for example, at about 800° C. When the second heat treatment temperature is in the foregoing temperature range, thermal and lithium-ion conduction properties of the finally obtained electrode active material are excellent.

Any core active material may be used as long as it is an electrode active material typically used in a lithium secondary battery. For example, the core active material may be $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$), $LiNi_{1-Y}Co_YO_2$ (where $0 \leq Y<1$), $LiCo_{1-Y}Mn_YO_2$ (where $0 \leq Y<1$), $LiNi_{1-Y}Mn_YO_2$ (where $0 \leq Y<1$), $Li(Ni_aCo_bMn_c)O_4$ (where $0<a<2$, $0<b<2$, $0<c<2$, $a+b+c=2$), $LiMn_{2-Z}Ni_ZO_4$ (where $0 \leq Z<2$), $LiMn_{2-Z}Co_ZO_4$ (where $0<Z<2$), $LiCoPO_4$, and/or $LiFePO_4$.

According to an embodiment of the present invention, $LiCoO_2$ is used as the core active material.

For example, the core active material doped with an alkaline earth metal may be $LiCoO_2$ doped with magnesium. A content of magnesium is in a range of 0.01 parts by weight to 3 parts by weight based on 100 parts by weight of the core active material.

X-ray photoelectron spectroscopy (XPS) analyses are performed on the electrode active material obtained according to the foregoing process, and a binding energy peak of an alkaline earth metal (M) is shown at a position corresponding to a 2S binding energy of the alkaline earth metal±0.1 to 2 eV.

For the XPS analysis, excitation (ESCA 250 spectrometer) was performed by using non-monochromatic Al Kα X-rays, and the chamber pressure was about $2 \times 10^{-9}$ mbar during the XPS analysis.

The energy of Al Kα1 is about 1486.6 eV, and an analysis area was about 2 $mm^2$. Samples are dispersed, and then the samples are pressed on indium foils and analyzed by being mounted on an XPS holder.

XPS analyses are performed on the coating layer, and a binding energy peak of magnesium is shown at a position corresponding to a 2S binding energy of magnesium±0.1 to 2 eV.

Also, when M of the coating layer formed on the core active material is magnesium, an irreversible peak of the electrode active material is shown at about 4.03±0.1 V during the measurement of an initial formation charge curve. Herein, the initial formation charge curve is evaluated after charging a battery including an electrode active material according to an embodiment of the present invention at a 0.1 C-rate to about 4.3 V and discharging at a 0.1 C-rate to about 3.0 V.

When M of the coating layer is magnesium, an exothermic peak is shown at about 130±1° C. during differential scanning calorimeter (DSC) analysis.

A Q20 model of TA Instruments is used for the DSC analysis, and a heating rate is about 10° C. per minute.

A composition of ethylene carbonate (EC)/ethylmethyl carbonate (EMC)/dimethyl carbonate (DMC) having a volume ratio of 3/4/4 using a 1.15 M $LiPF_6$ salt is used as an electrolyte in a cell, and polyvinylidene fluoride (Solef 6020) is used as a binder. A composition having a weight ratio of active material:conductive agent (Denka black):binder of 94:3:3 is used.

When M of the coating layer is magnesium, an exothermic peak is shown at about 331±1° C. during DSC analysis.

Hereinafter, a method of preparing a lithium secondary battery using the electrode active material for a lithium secondary battery is described, and more particularly, a method of preparing a lithium secondary battery having a cathode, an anode, and an electrolyte according to an embodiment using the electrode active material as a cathode active material is described.

The cathode and the anode are prepared by respectively coating compositions for forming a cathode active material layer and an anode active material layer on current collectors and drying the compositions.

First, the composition for forming the cathode active material layer is prepared by using an electrode active material, which includes a core active material and a coating layer including a compound represented as Formula 1 on a surface of the core active material, as the cathode active material.

The composition for forming the cathode active material layer is prepared by mixing the cathode active material, a conductive agent, a binder, and a solvent.

The binder is a component that helps to combine the cathode active material and the conductive agent, and bond with the current collector. The binder is added in a range of 1 part by weight to 50 parts by weight and for example, in a range of 2 parts by weight to 10 parts by weight based on 100 parts by weight of the cathode active material. When a content of the binder is in the foregoing range, a binding force of the cathode active material layer with respect to the current collector is good.

Examples of the binder may be polyvinylidene fluoride, polyvinyl alcohol, carboxymethyl cellulose (CMC), starch, hydroxypropyl cellulose, regenerated cellulose, polyvinylpyrrolidone, polyethylene, polypropylene, ethylene-propylene-diene terpolymer (EPDM), sulfonated EPDM, styrene butyrene rubber, fluorine rubber, various copolymers, etc.

The conductive agent is not particularly limited as long as it does not generate chemical change in the battery, and has conductivity. Examples of the conductive agent may be graphite such as natural graphite or artificial graphite, carbon black such as acetylene black, Ketjen black, channel black, furnace black, lamp black, conductive fibers such as carbon fibers or metal fibers, metal powder such as aluminium powder, or nickel powder, conductive whiskers such as zinc oxide or potassium titanate, conductive metal oxide such as titanium oxide, a conductive material such as a polyphenylene derivative, etc. A content of the conductive agent used is in a range of 1 part by weight to 30 parts by weight and for example, in a range of 2 parts by weight to 10 parts by weight based on 100 parts by weight of the cathode active material. When the content of the conductive agent is in the foregoing range, capacity characteristics may be maintained, and the finally obtained electrode has excellent conductivity.

The solvent used may be N-methyl-2-pyrrolidone, etc., and the content thereof is in a range of 80 parts by weight to 400 parts by weight based on 100 parts by weight of the cathode active material. When the content of the solvent is in the foregoing range, a process for forming the active material layer is facilitated.

The cathode current collector has a thickness range of about 3 μm to about 500 μm, and is not limited thereto as long as it does not generate chemical change in the battery as well as having high conductivity. Examples of the cathode current collector may be stainless steel, aluminium, nickel, titanium, sintered carbon, or aluminium or stainless steel surface treated with carbon, nickel, titanium, silver, etc. Fine irregularities may also be formed on a surface of the current collector to increase adhesion of the cathode active material, and the current collector may have various forms such as a film, sheet, foil, net, porous body, foam, or nonwoven fabric.

Alternatively, a composition for forming an anode active material layer is prepared by mixing an anode active material, a binder, a conductive agent, and a solvent.

Examples of the anode active material may be a carbon-based material capable of storing and releasing lithium ions, such as graphite, carbon, lithium metal and alloys, a silicon oxide-based material, etc.

The binder is a component that helps to combine the anode active material and the conductive agent, and bond with the current collector. The binder is generally added in a range of 1 part by weight to 50 parts by weight and for example, in a range of 2 parts by weight to 10 parts by weight based on 100 parts by weight of the anode active material. The binder used in the cathode may be employed for the foregoing binder.

A content of the conductive agent used is in a range of 1 part by weight to 30 parts by weight and for example, in a range of 2 parts by weight to 10 parts by weight based on 100 parts by weight of the anode active material. When the content of the conductive agent is in the foregoing range, conductivity of the finally obtained electrode is excellent.

A content of the solvent used is in a range of 80 parts by weight to 400 parts by weight based on 100 parts by weight of the anode active material. When the content of the solvent is in the foregoing range, a process for forming the anode active material layer is facilitated.

The same type of materials used in preparing the cathode may be employed for the conductive agent and solvent.

The anode current collector generally has a thickness range of about 3 μm to about 500 μm, and is not limited thereto as long as it does not generate chemical change in the battery, and has conductivity. Examples of the anode current collector may be copper, stainless steel, aluminium, nickel, titanium, sintered carbon, copper or stainless steel surface treated with carbon, nickel, titanium, or silver, an aluminium-cadmium alloy, etc. Also, adhesion of the anode active material may also be increased by forming fine irregularities on a surface of the anode current collector like the cathode current collector, and the anode current collector may be used in various forms such as film, sheet, foil, net, porous body, foam, nonwoven fabric, etc.

A separator is disposed between the cathode and the anode prepared according to the foregoing processes.

A battery assembly is formed by disposing the separator between the foregoing cathode and the foregoing anode. The battery assembly is wound and folded to be contained in a cylindrical or rectangular battery case, and then a lithium-ion battery is completed by injecting an electrolyte solution. Also, the battery structure is stacked in a bi-cell structure, and then impregnated in an organic electrolyte solution according to an embodiment of the present invention. A lithium-ion polymer battery is completed when a product thus obtained is contained in a pouch and sealed.

Figure 1:
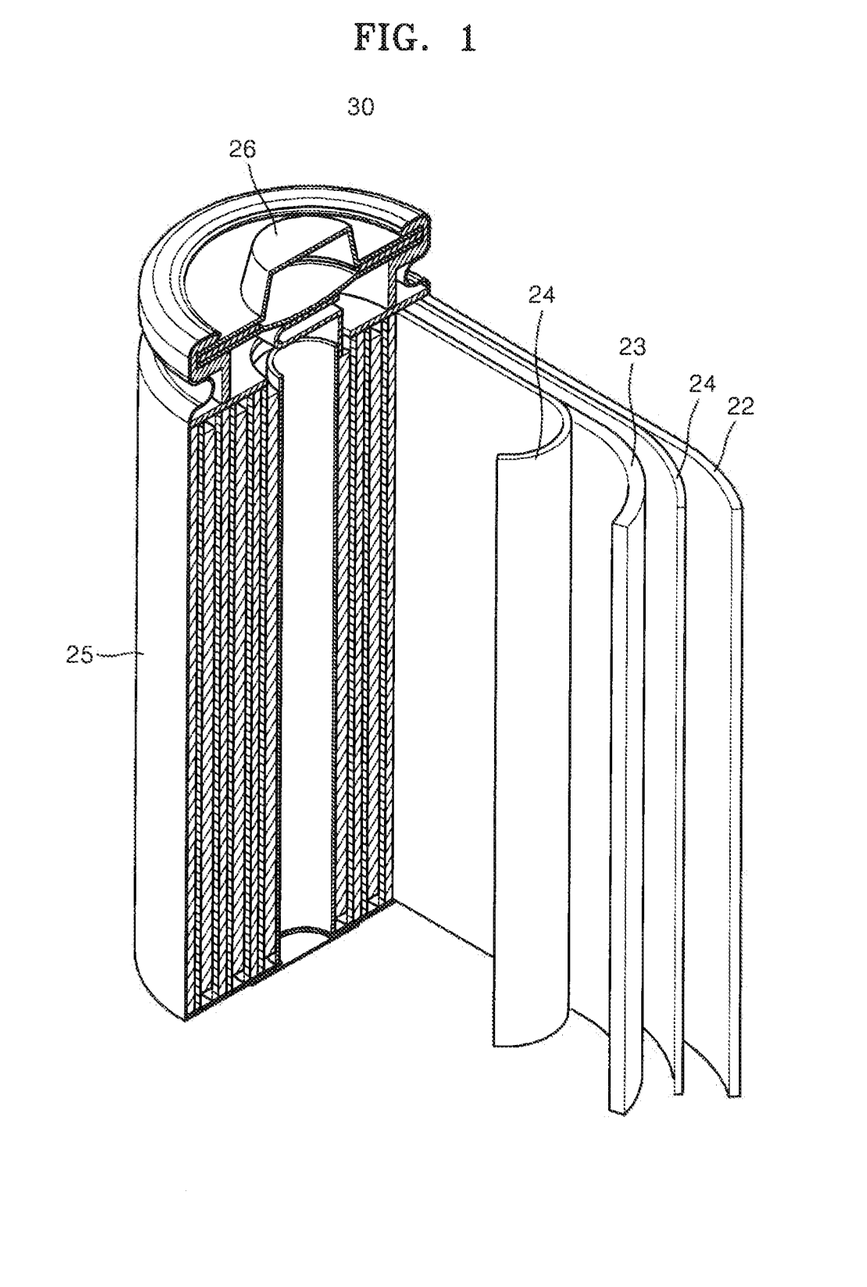
FIG. 1 schematically illustrates a typical structure of a lithium secondary battery according to an embodiment of the present invention.

FIG. 1 schematically illustrates a typical structure of a lithium secondary battery according to an embodiment of the present invention.

As shown in FIG. 1, the lithium battery 30 is composed of a cathode 23 including a cathode active material according to an embodiment of the present invention, an anode 22, a separator 24 disposed between the cathode 23 and the anode 22, an electrolyte impregnated between the cathode 23, the anode 22, and the separator 24, a battery case 25, and a sealing member 26 sealing the battery case 25 as main elements. The cathode 23, the separator 24, and the anode 22 are sequentially stacked, and then wound in a spiral shape. The lithium battery 30 may be formed by containing the spiral-shaped wound stack in the battery case 25.

The separator 24 has a pore diameter range of about 0.01 μm to about 10 μm, and has a thickness range of about 5 μm to about 300 μm. As a particular example, the separator 24 has a sheet or unwoven fabric form and is formed of an olefin-based polymer such as polyethylene or polypropylene, glass fibers, etc. When a polymer electrolyte is used as an electrolyte, the polymer electrolyte may be used with the foregoing separator 24.

An electrolyte solution is formed of a non-aqueous organic solvent and a lithium salt.

The non-aqueous organic solvent always includes chain carbonate and cyclic carbonate.

Examples of the chain carbonate may be DMC, EMC, diethyl carbonate (DEC), methylpropyl carbonate (MPC), dipropyl carbonate (DPC), ethylpropyl carbonate (EPC), etc.

Examples of the cyclic carbonate may be EC, propylene carbonate (PC), etc.

A total content of the chain carbonate is in a range of 50 parts by volume to 90 parts by volume based on 100 parts by volume of the non-aqueous organic solvent.

The non-aqueous organic solvent may further include an ester-based, ether-based, ketone-based, alcohol-based, and/or aprotic solvent.

Examples of the ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, etc. However, the ester-based solvent is not limited thereto.

Examples of the ether-based solvent may be dibutyl ether, tetraglyme, diglyme, dimethoxyethane, 2-methyltetrahydrofuran, tetrahydrofuran, etc. However, the ether-based solvent is not limited thereto.

Examples of the ketone-based solvent may be cyclohexanone, etc. However, the ketone-based solvent is not limited thereto.

Examples of the alcohol-based solvent may be ethyl alcohol, isopropyl alcohol, etc. However, the alcohol-based solvent is not limited thereto.

Examples of the aprotic solvent may be nitriles such as R—CN (where R is a straight-chain, branched, or cyclic hydrocarbon group with a carbon number range of about 2 to about 20 and may include a double bond aromatic ring or an ether bond), amides such as dimethylformamide, dioxolanes such as 1,3-dioxolane, sulfolanes, etc. However, the aprotic solvent is not limited thereto.

For example, according to an embodiment of the present invention, the non-aqueous organic solvent includes EC, EMC, or DMC. For example, a mixing volume ratio of EC, EMC, and DMC is 3:4:4. However, the mixing volume ratio is not limited thereto.

A lithium salt in the electrolyte solution is dissolved in the non-aqueous organic solvent to act as a source of lithium ions in a lithium battery. Thus, the lithium salt enables a basic lithium battery operation and functions to promote transfer of lithium ions between the cathode and the anode.

For example, the lithium salt may include one or more supporting electrolytic salts selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, or lithium bisoxalate borate ($LiB(C_2O_4)_2$).

A concentration of the lithium salt is in a range of about 1.0 M to about 2.0 M, and for example, about 0.6 M to about 2.0 M. The concentration of the lithium salt may be in a range of about 0.7 M to about 1.5 M. When the concentration of the lithium salt satisfies the foregoing ranges, appropriate conductivity and viscosity of the electrolyte solution may be achieved and lithium ions may be effectively transferred.

Hereinafter, the present invention is described in more detail with reference to Examples below. However, the present invention is not limited thereto.

Preparation Example 1

Preparation of Electrode Active Material

About 10 g of $LiCoO_2$ and about 0.009 g of Mg were mixed to prepare a mixture of $LiCoO_2$ and magnesium.

The mixture was heat treated in a vacuum at about 800° C. for about 30 minutes, and then the resultant was heat treated at about 800° C. under a nitrogen gas atmosphere for about 1 hour to obtain an electrode active material ($Li_{0.5}$—$Mg_1N_1$) including a $LiCoO_2$ core active material and a coating layer of lithium magnesium nitride (LiMgN) formed on a surface of the core active material.

Preparation Example 2

Preparation of Electrode Active Material

Except for performing a vacuum heat treatment of the mixture of $LiCoO_2$ and magnesium at about 750° C. instead of about 800° C., an electrode active material was prepared using the method of Preparation Example 1.

Preparation Example 3

Preparation of Electrode Active Material

Except for performing a vacuum heat treatment of the mixture of $LiCoO_2$ and magnesium at about 850° C. instead of about 800° C., an electrode active material was prepared using the method of Preparation Example 1.

Comparative Preparation Example 1

Preparation of Electrode Active Material

A mixture of $LiCoO_2$ and magnesium was prepared by mixing about 10 g of $LiCoO_2$ and about 0.009 g of magnesium.

An electrode active material was prepared by heat treating the mixture at about 600° C. in a nitrogen gas atmosphere for about 1 hour.

Comparative Preparation Example 2

Preparation of Electrode Active Material

Except for performing a heat treatment of the mixture of $LiCoO_2$ and magnesium in a vacuum and a nitrogen gas atmosphere at about 600° C. instead of about 800° C., an electrode active material was prepared using the method of Preparation Example 1.

Comparative Preparation Example 3

Preparation of Electrode Active Material

A mixture of $LiCoO_2$ and magnesium was prepared by mixing about 10 g of $LiCoO_2$ and about 0.009 g of magnesium.

An electrode active material having a magnesium component on the surface thereof was prepared by heat treating the mixture at about 800° C. in a nitrogen gas atmosphere for about 1 hour.

Figure 2:
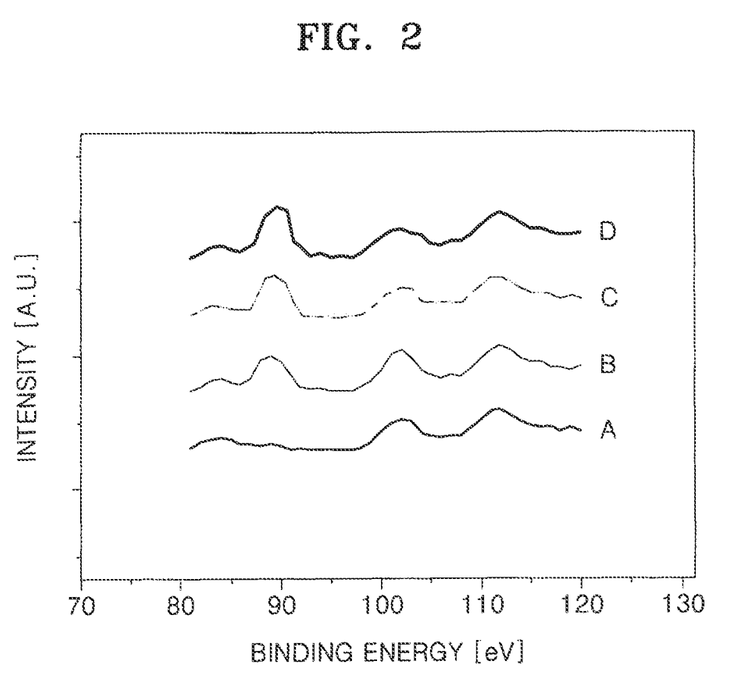
FIG. 2 shows results of X-ray photoelectron spectroscopy (XPS) analysis on electrode active materials prepared in Preparation Example 1 and Comparative Preparation Examples 1 to 3.

The electrode active materials prepared in Preparation Example 1 and Comparative Preparation Examples 1 to 3 were analyzed by XPS, and the results thereof are shown in FIG. 2. In FIG. 2, A denotes the electrode active material of Comparative Preparation Example 1, B denotes the electrode active material of Comparative Preparation Example 2, C denotes the electrode active material of Comparative Preparation Example 3, and D denotes the electrode active material prepared in Preparation Example 1.

Referring to FIG. 2, it may be understood that magnesium does not exist on a surface of $LiCoO_2$ (hereinafter, LCO) in the case of A, and existence of magnesium on the surface of LCO was confirmed in the case of B and C.

In contrast, a binding energy peak of magnesium was observed at a range of about 89.9 eV to about 90 eV in the case of D. Thus, it may be understood that magnesium forms a compound with other components, i.e., lithium and nitrogen, differing from the cases of B and C where magnesium exists on the surface of LCO.

Surface composition analyses on the electrode active materials obtained according to Preparation Example 1 and Comparative Preparation Examples 1 to 3 were performed using XPS, and the results thereof are shown in Table 1 below. In Table 1, % denotes atomic %, and "ND" denotes "not detected".

TABLE 1

|   | C, % | O, % | Co, % | Mn, % | Ni, % | Li, % | F, % | Na, % | Mg, % | S, % | N, % |
|---|------|------|-------|-------|-------|-------|------|-------|-------|------|------|
| A | 12.4 | 66.2 | 13.0  | ND    | ND    | 4.7   | 2.3  | 0.6   | ND    | 0.5  | 0.2  |
| B | 12.3 | 66.0 | 13.0  | ND    | ND    | 4.9   | 2.0  | 0.5   | 0.6   | 0.5  | 0.2  |
| C | 12.3 | 65.3 | 13.1  | ND    | ND    | 5.0   | 2.0  | 0.6   | 0.9   | 0.5  | 0.3  |
| D | 12.4 | 64.7 | 12.9  | ND    | ND    | 5.1   | 1.8  | 0.6   | 0.9   | 0.5  | 1.0  |

In Table 1, A denotes Comparative Preparation Example 1, B denotes Comparative Preparation Example 2, C denotes Comparative Preparation Example 3, and D denotes Preparation Example 1.

Referring to Table 1, it may be understood that lithium and nitrogen contents are increased in the electrode active material obtained according to Preparation Example 1 after heat treating in a vacuum and a nitrogen environment.

It may be understood from the results of FIG. 2 and Table 1 that the coating layers of the electrode active materials are composed of Li—Mg—N.

Example 1

Preparation of Cathode and Battery Using the Same

A 2023 coin-cell was prepared according to the following process using an electrode active material prepared according to Preparation Example 1 as a cathode active material.

About 0.15 g of polyvinylidene fluoride and about 0.15 g of Denka black was added to about 4.7 g of the electrode active material prepared according to Preparation Example 1 as a cathode active material to obtain a mixture, and then the mixture was dispersed in about 5.35 g of N-methylpyrrolidone to prepare a composition for forming a cathode active material layer. A mixing weight ratio of the cathode active material, polyvinylidene fluoride, and Denka black in the composition for forming a cathode active material layer was 94:3:3.

The composition for forming a cathode active material layer was coated on an aluminum foil to a thickness of about 135 μm, to prepare a thin electrode plate, and then the resultant electrode plate was dried at about 110° C. for 20 minutes or more. Thereafter, the dried electrode plate was pressed to prepare a cathode plate having a thickness of about 40 μm.

Thereafter, a 2023 type coin-cell was prepared using the cathode and a lithium metal as a counter electrode of the cathode.

A separator (thickness: about 16 μm) composed of a porous polyethylene (PE) film was disposed between the cathode plate and the lithium metal counter electrode to form an electrode assembly, and an electrolyte solution was injected into the electrode assembly to prepare the 2032 type coin-cell.

At this time, the electrolyte solution used was a solution including 1.15 M $LiPF_6$ dissolved in a solvent mixed with EC, EMC, and DMC in a volume ratio of 3:3:4.

Examples 2 to 3

Preparation of Cathode and Battery Using the Same

Except for respectively using the electrode active material of Preparation Example 2 and the electrode active material of Preparation Example 3 instead of using the electrode active material prepared according to Preparation Example 1, batteries were prepared using the process of Example 1.

Comparative Example 1

Preparation of Cathode and Battery Using the Same

Except for using the electrode active material prepared according to Comparative Preparation Example 1 instead of using the electrode active material prepared according to Preparation Example 1, a coin-cell was prepared using the process of Example 1.

Comparative Example 2 to 3

Preparation of Cathode and Battery Using the Same

Except for respectively using the electrode active material prepared according to Comparative Preparation Example 2 and the electrode active material prepared according to Comparative Preparation Example 3 instead of using the electrode active material prepared according to Preparation Example 1, coin-cells were prepared using the process of Example 1.

Figure 3:
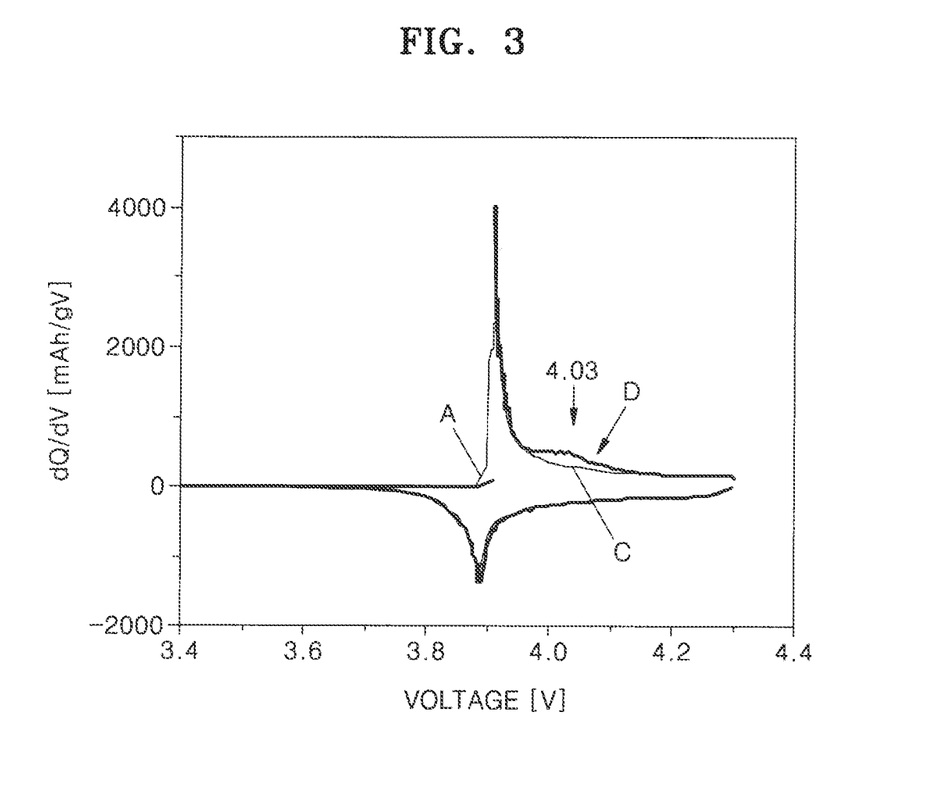
FIG. 3 shows initial formation charge-discharge characteristics of a battery prepared according to Example 1.

Charge-discharge characteristics at initial 0.1 C were investigated in the batteries prepared according to Example 1 and Comparative Examples 1 to 3, and the results thereof are shown in FIG. 3.

The initial formation charge-discharge characteristics are evaluated after charging the coin-cell of Example 1 at 0.1 C to about 4.3 V and discharging at 0.1 C to about 3.0 V.

FIG. 3 shows curves of dQ/dV with respect to voltage at an initial 0.1 C-rate in the charge-discharge characteristics, and A denotes the electrode active material nitrogen heat treated at about 600° C. under a nitrogen gas atmosphere, C denotes the electrode active material heat treated at about 800° C. under a nitrogen gas atmosphere, and D denotes the electrode active material heat treated under a nitrogen gas atmosphere after heat treatment at about 800° C. under a vacuum.

Referring to FIG. 3, voltages corresponding to peak values during charging are changed before and after heat treatments. Therefore, it may be understood that an irreversible reaction was additionally performed at about 4.03 V due to the generation of a coating layer formed on the surface of $LiCoO_2$ generated by the use of the foregoing vacuum/$N_2$ heat treatment.

Figure 4:
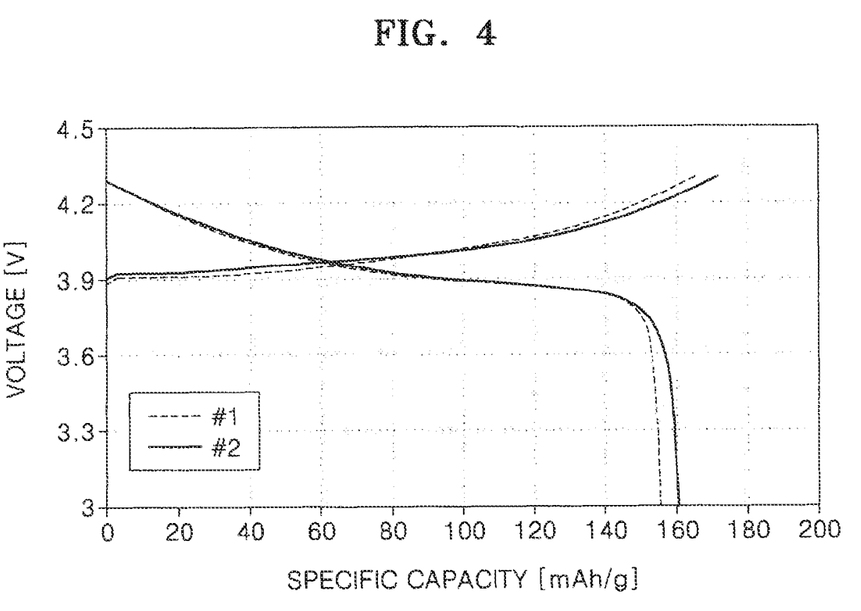
FIG. 4 shows charge-discharge characteristics at initial 0.1 C of a battery prepared according to Example 1.

Charge-discharge characteristics at initial 0.1 C were investigated in the battery prepared according to Example 1, and the results thereof are shown in FIG. 4.

In FIG. 4, #1 denotes a state of the electrode active material before vacuum and nitrogen heat treatments, and #2 denotes a state of the electrode active material after vacuum and nitrogen heat treatments.

The charge-discharge characteristics are evaluated after performing about 60 cycles of charging at a 1.0 C-rate to about 4.3 V and discharging to about 3.0 V.

Referring to FIG. 4, it may be understood that a discharging capacity is equal or greater even though a Li—Mg—N layer is formed on the surface of $LiCoO_2$ by performing a heat treatment, and the coating layer acts as a lithium ion conductor that does not deteriorate conduction performance of a battery.

Figure 5:
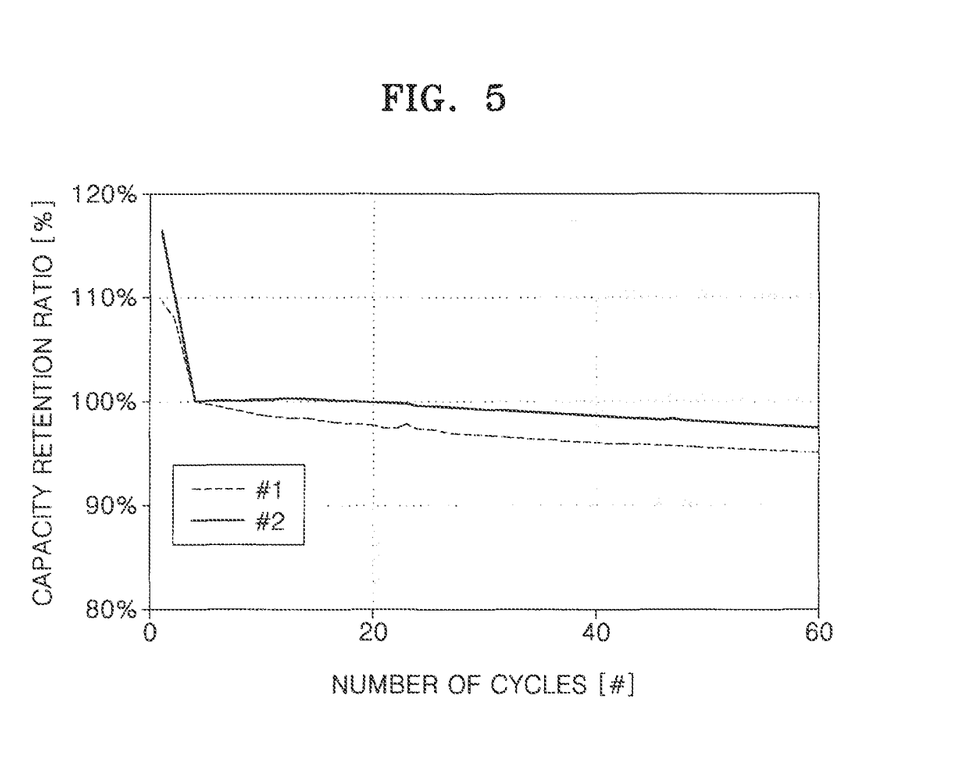
FIG. 5 shows results of analysis on a capacity retention ratio of a battery prepared according to Example 1.

A capacity retention ratio was investigated in the battery prepared according to Example 1, and the results thereof are shown in FIG. 5. In FIG. 5, #1 denotes a state of the electrode active material before vacuum and nitrogen heat treatments, and #2 denotes a state of the electrode active material after vacuum and nitrogen heat treatments.

The capacity retention ratio is evaluated under the following condition.

The coin cell prepared according to Example 1 was subjected to about 60 cycles of charging at a constant current (0.1 C-rate) to a cut-off of about 4.3 V and discharging at a constant current (0.1 C-rate) to a cut-off of about 3.0 V. That is, life characteristics of each coin cell were evaluated by measuring a capacity retention ratio in terms of changes in a discharging capacity according to the number of charge-discharge cycles.

Referring to FIG. 5, it may be understood that as a result of forming a Li—Mg—N layer on the surface of LCO, a capacity retention ratio of the heat-treated battery is higher than that of the battery without a heat treatment when about 60 cycles of charge and discharge were performed at a 1.0 C-rate. Decomposition of the electrolyte solution is reduced or prevented in a battery using an active material having a Li—Mg—N coating layer formed through a heat treatment and a coating layer formed by an irreversible reaction generated by the Li—Mg—N coating layer. It may be understood that a discharging capacity of the foregoing battery is excellent because it has excellent lithium ion conductivity.

The coin-cell prepared according to Example 1 was charged at an initial 0.1 C to about 4.3 V, and then the coin-cell was disassembled and thermal properties of a material, including an active material and an electrolyte at a constant ratio, were investigated by using a differential scanning calorimeter (DSC). The results thereof are shown in FIGS. 6 and 7.

Figure 6:
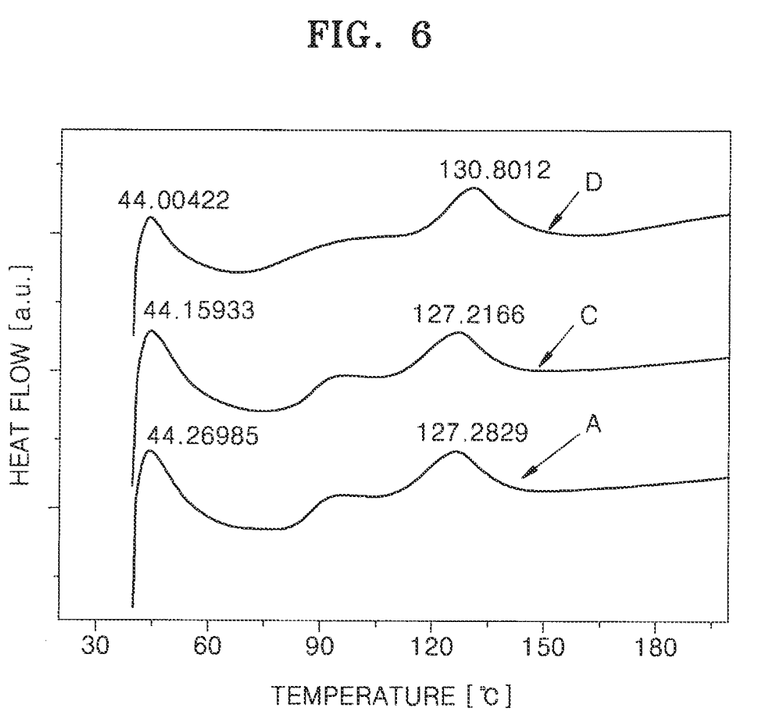
FIGS. 6 and 7 show results of differential scanning calorimeter (DSC) analysis on coin cells prepared according to different heat treatments.
Figure 7:
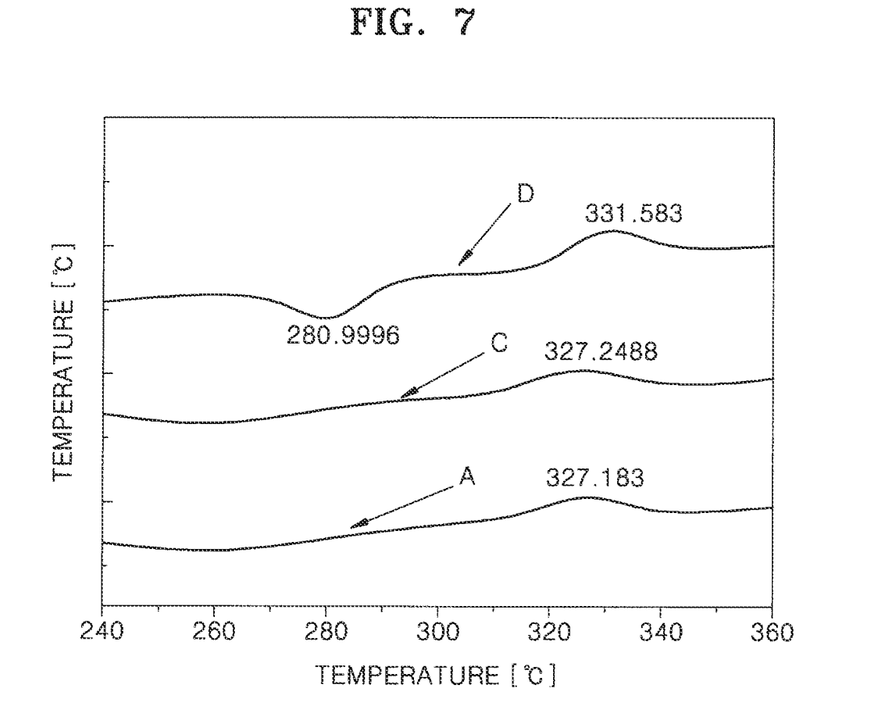

In FIGS. 6 and 7, A denotes a state of the electrode active material nitrogen heat treated at about 600° C., C denotes a state of the electrode active material nitrogen heat treated at about 800° C., and D denotes a state of the electrode active material after vacuum heat treatments at about 800° C. and nitrogen heat treatment at about 800° C.

DSC measurements were made in a mixing ratio range of about 3.2 mg to about 3.8 mg of the active material including a core active material and about 3.2 μl to about 3.8 μl of the electrolyte solution. The DSC measurements were made while heating to about 400° C. at a rate of 10° C./minute, after heating to about 40° C. and maintaining the temperature at 40° C. for about 5 minutes.

Referring to FIG. 6, in the case of A and C, i.e., when a Li—Mg—N coating layer is not formed, an exothermic peak shows at about 127° C. However, in the case of D, i.e., when the Li—Mg—N coating layer is formed, it may be understood that an exothermic peak is shifted to about 130° C. which is a temperature higher than those of A and C. The exothermic peak at this temperature range is due to a thermal decomposition between a solid electrolyte interface (SEL) and an electrolyte.

Thus, when a Li—Mg—N layer is formed by interaction between the surface of LCO and the electrolyte, it may be understood that an initial exothermic peak is moved to a higher temperature. It may also be understood that a calorific value is decreased from about 207.9 J/g to about 169.0 J/g after forming the Li—Mg—N layer in comparison to the case where the Li—Mg—N layer is not formed.

Referring to FIG. 7, an exothermic peak shown at about 327° C. is also shifted to about 331° C. when a Li—Mg—N layer is formed. Therefore, it may be understood that the Li—Mg—N coating layer formed on the surface of $LiCoO_2$ contributes to improve the safety of a battery.

The foregoing exothermic peak above about 300° C. is due to the decomposition of the polyvinylidene fluoride binder and the electrolyte mixed with the active material.

As described above, according to the one or more of the above embodiments of the present invention, when an electrode active material having a coating layer formed of lithium-alkaline earth metal-nitride is used, stability is improved by protecting from or preventing the decomposition of an electrolyte during charging and discharging of a battery. Therefore, a lithium secondary battery having excellent charge-discharge characteristics may be prepared.

While the present invention has been particularly shown and described with reference to Preparation Examples thereof, it will be understood by those skilled in the art that various changes in form and details may be made therein without departing from the spirit and scope of the invention. Also, while the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode active material comprising:
a core active material; and
a coating layer, comprising a compound represented by Formula 1, on a surface of the core active material, $$Li_a\text{-}M_b\text{-}N_c \quad \text{[Formula 1]}$$

where, M denotes an alkaline earth metal,
a/(a+b+c) is in a range of about 0.10 to about 0.40,
b/(a+b+c) is in a range of about 0.20 to about 0.50, and
c/(a+b+c) is in a range of about 0.20 to about 0.50.

2. The electrode active material of claim 1, wherein, in Formula 1, {a/(a+b+c)} is in a range of about 0.15 to about 0.35, {b/(a+b+c)} is in a range of about 0.3 to about 0.45, and {c/(a+b+c)} is in a range of about 0.30 to about 0.45.

3. The electrode active material of claim 1, wherein M is at least one selected from the group consisting of magnesium (Mg), calcium (Ca), strontium (Sr), and barium (Ba).

4. The electrode active material of claim 1, wherein the core active material is at least one selected from the group consisting of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$), $LiNi_{1-Y}Co_YO_2$ (where $0\leq y<1$), $LiCo_{1-Y}Mn_YO_2$ (where $0\leq y<1$), $LiNi_{1-Y}Mn_YO_2$ (where $0\leq y<1$), $Li(Ni_aCo_bMn_c)O_4$ (where $0<a<2$, $0<b<2$, $0<c<2$, $a+b+c=2$), $LiMn_{2-z}Ni_zO_4$ (where $0<Z<2$), $LiMn_{2-z}Co_zO_4$ (where $0<z<2$), $LiCoPO_4$, and $LiFePO_4$.

5. The electrode active material of claim 1, wherein the core active material is lithium cobalt oxide ($LiCoO_2$).

6. The electrode active material of claim 1, wherein, in Formula 1, a is in a range of about 0.5 to about 1.0, b is about 1.0, and c is about 1.0.

7. The electrode active material of claim 1, wherein a binding energy peak of the alkaline earth metal (M) on the coating layer analyzed by X-ray photoelectron spectroscopy is shown at a position corresponding to a 2S binding energy of the alkaline earth metal±0.1 to 2 eV.

8. The electrode active material of claim 1, wherein the alkaline earth metal (M) is at least magnesium (Mg), and wherein a binding energy peak of magnesium (Mg) on the coating layer analyzed by X-ray photoelectron spectroscopy is at a position corresponding to a 2S binding energy of magnesium±0.1 to 2 eV.

9. The electrode active material of claim 1, wherein differential scanning calorimeter (DSC) analysis of the electrode active material provides an exothermic peak at about 130±1° C., and wherein the alkaline earth metal (M) of the coating layer is magnesium (Mg).

10. The electrode active material of claim 1, wherein differential scanning calorimeter (DSC) analysis of the electrode active material provides an exothermic peak at about 331±1° C., and wherein the alkaline earth metal (M) of the coating layer is magnesium (Mg).

11. The electrode active material of claim 1, wherein a thickness of the coating layer is in a range of about 1 nm to about 100 nm.

12. A method of preparing an electrode active material of claim 1, the method comprising:
    performing a first heat treatment of the core active material doped with the alkaline earth metal (M) in a vacuum at a temperature range of about 750° C. to about 850° C.; and
    performing a second heat treatment of the heat-treated core active material in a nitrogen atmosphere.

13. The method of claim 12, wherein the second heat treatment is performed at a temperature range of about 750° C. to about 850° C.

14. An electrode for a lithium secondary battery comprising the electrode active material of claim 1.

15. A lithium secondary battery comprising the electrode of claim 12.

16. The lithium secondary battery of claim 12, wherein an initial formation charge curve of the lithium secondary battery provides an irreversible peak at about 4.03±0.1 V, and wherein the alkaline earth metal (M) of the coating layer is magnesium (Mg).

* * * * *

UNITED STATES PATENT AND TRADEMARK OFFICE
CERTIFICATE OF CORRECTION

PATENT NO. : 8,530,093 B2
APPLICATION NO. : 13/241196
DATED : September 10, 2013
INVENTOR(S) : Jae-Hyuk Kim et al.

It is certified that error appears in the above-identified patent and that said Letters Patent is hereby corrected as shown below:

In the Claims

| | |
|---|---|
| Col. 12, line 50, Claim 1 | Delete "$Li_a\text{-}M_b\text{-}Ne$", Insert -- $Li_a\text{-}M_b\text{-}N_c$ -- |
| Col. 12, line 66, Claim 4 (1st instance) | Delete "(where $0 \leq y < 1$)", Insert -- (where $0 \leq Y < 1$) -- |
| Col. 12, line 66, Claim 4 (2nd instance) | Delete "(where $0 \leq y < 1$)", Insert -- (where $0 \leq Y < 1$) -- |
| Col. 12, line 67, Claim 4 | Delete "(where $0 \leq y < 1$)", Insert -- (where $0 \leq Y < 1$) -- |
| Col. 13, line 2, Claim 4 | Delete "(where $0 < z < 2$)", Insert -- (where $0 < Z < 2$) -- |
| Col. 13, line 12, Claim 7 | Delete "shown" |
| Col. 13, line 13, Claim 7 | Delete "metal±0.1", Insert -- metal ± 0.1 -- |
| Col. 13, line 19, Claim 8 | Delete "magnesium±0.1", Insert -- magnesium ± 0.1 -- |
| Col. 13, line 22, Claim 9 | Delete "130±1°", Insert -- 130 ± 1 ° -- |

Signed and Sealed this
Seventeenth Day of March, 2015

Michelle K. Lee
*Director of the United States Patent and Trademark Office*

CERTIFICATE OF CORRECTION (continued)
U.S. Pat. No. 8,530,093 B2

Col. 14, line 20, Claim 15                    Delete "claim 12",
                                                              Insert -- claim 14 --

Col. 14, line 21, Claim 16                    Delete "claim 12",
                                                              Insert -- claim 15 --